United States Patent [19]

Davis

[11] 4,090,700
[45] May 23, 1978

[54] SPRING ASSISTER

[76] Inventor: Robert E. Davis, 5437 Davis Trail, Yucca Valley, Calif. 92284

[21] Appl. No.: 819,175

[22] Filed: Jul. 26, 1977

[51] Int. Cl.² .............................................. F16F 1/22
[52] U.S. Cl. ........................................ 267/45; 267/48
[58] Field of Search ....................... 267/48, 45, 46, 54, 267/55, 56, 36, 38

[56] References Cited

U.S. PATENT DOCUMENTS

| 1,546,144 | 7/1925 | Mills | 267/45 |
| 1,959,118 | 5/1934 | Uffelman | 267/45 |

Primary Examiner—James B. Marbert
Attorney, Agent, or Firm—John N. Randolph

[57] ABSTRACT

A device supported by a vehicle frame for engagement with a leaf spring, attached to the rear axle of the vehicle, to increase the resistance afforded by the spring in supporting the rear part of the vehicle frame and the load carried thereby.

2 Claims, 4 Drawing Figures

SPRING ASSISTER

SUMMARY

It is a primary object of the present invention to provide a spring assister carried by a vehicle frame and readily movable into or out of engagement with a rear leaf spring of the vehicle for assisting the spring in supporting a heavier than normal load.

Other objects of the invention are to provide such a device which is utilized in sets of two for each leaf spring, one near each end of the spring, which will function with the spring for maintaining the vehicle level fore and aft as well as side to side; which is adjustable for different loads; which minimizes side sway in windy weather and in making turns; which keeps headlights properly aimed, and which is easy to initially install and to adjust for varying load conditions.

Various other objects and advantages of the invention will hereinafter become more fully apparent from the following description of the drawing, illustrating a presently preferred embodiment thereof, and wherein:

DESCRIPTION OF THE PREFERRED EMBODIMENT

Figure 1:
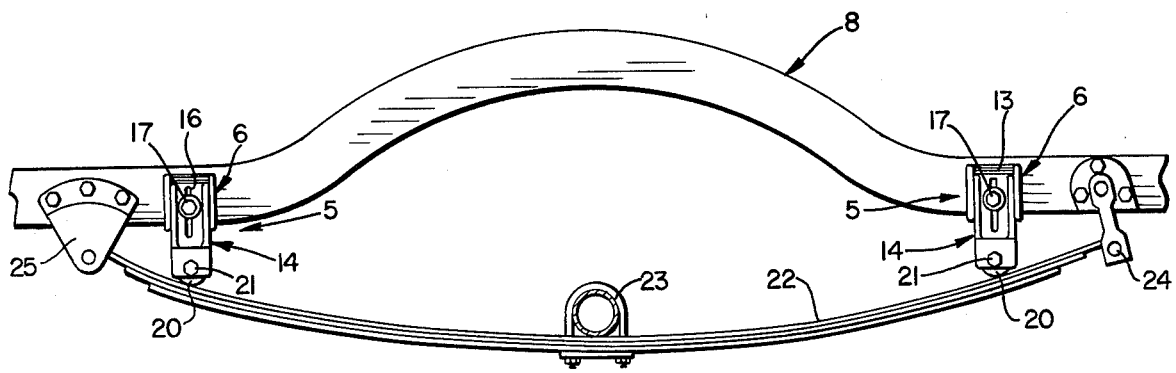
FIG. 1 is a side elevational view showing a part of one side frame member, a leaf spring which is attached thereto and to the rear axle, and showing two of the spring assisters in applied positions to assist the spring in supporting its load.

Referring more specifically to the drawing, the spring assister in its entirety and comprising the invention is designated generally 5 and includes an angle bracket 6 having a long upright leg 7 one side of which bears against the outer side of one of the side frame members 8 of a motor vehicle such as an automobile or light truck. The bracket 7 also includes a bottom leg 9 which bears against the underside of the bottom flange 10 of the frame member 8 and which extends to beyond the inner edge thereof. A clamp bar 11 rests on the upper side of said bottom flange 10 and is connected to the bottom leg 9 by a nut and bolt fastening 12 which is tightened to clamp the bottom flange 10 between the leg 9 and plate 11, to thus secure the bracket 6 immovably in the frame member 8. The upright bracket leg 7 has an outer side which is provided with horizontal serrations 13 from top to bottom thereof.

The spring assister 5 includes a support member 14 having a vertically extending upper portion 15 of a width corresponding to the serrated face 13. Said portion 15 has an elongated vertical slot 16 to receive a bolt 17 which is threaded into a socket, not shown, of the leg 7 and which carries a washer 18 against which the head of the bolt bears for clamping the support member 14 immovably to the bracket 6 when the bolt 17 is tightened. The inner side of the upright portion 15 is likewise provided with serrations, not shown, corresponding to the serrations 13 for meshing engagement therewith, for holding the support member 14 in different vertically adjusted positions relative to the bracket 6 when the bolt 17 is tightened.

The lower part of the support member 14, below the bracket 6, is flared outwardly and recessed to provide a downwardly openin fork 19 in which a roller 20 is supported on a pin 21 which extends through the furcations of the fork and which is disposed perpendicular to the side frame member 8.

As seen in FIG. 1, two of the units 5 are mounted on each frame side 8 and associated with each rear leaf spring 22 and the rear axle 23 to which the spring 22 is secured. The spring assisters 5 are located between the adjacent the rear spring shackle 24 and the front spring shackle 25.

Figure 4:
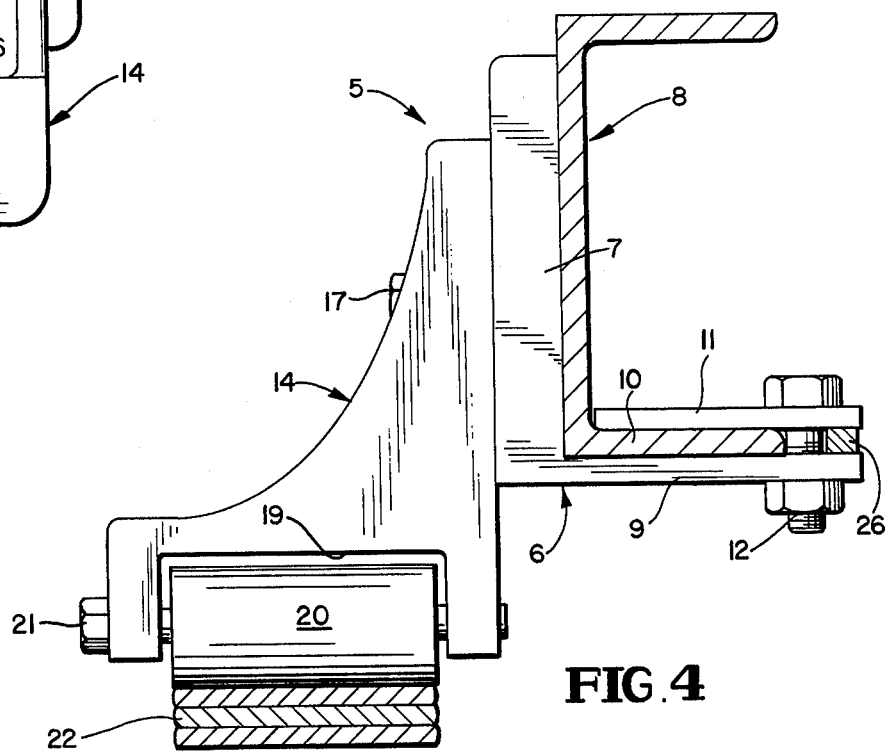
FIG. 4 is an enlarged view looking from right to left of FIG. 3 but showing the spring assister applied to a vehicle frame and in a position to assist one rear vehicle spring.

When the vehicle, of which the frame 8 forms a part, is carrying more than a normal load, the two spring assisters 5, associated with each rear spring 22, are disposed as illustrated in FIGS. 1 and 4 with the support member 14 positioned vertically and extending below the bracket 6, so that its roller 20 is resting on the upper leaf of the spring 22. The two units 5 of each spring then function to assist the spring in supporting the load carried by the rear part of the vehicle of which the frame 8 forms a part, so that said rear end of the vehicle will not sag and the frame will remain substantially level from end to end and from side to side. The extent that support members 14 are adjusted vertically relative to the bracket 6 will vary depending upon the amount of assistance required of the units 5 in supporting the frame on the springs 22, properly leveled. The units 6 can be adjusted forwardly and rearwardly between the spring hangers 24 and 25. The further the units 6 are spaced from the spring hangers, the more said units will function in supporting the load and the stiffer will be the resulting ride of the vehicle. The units 6 also relieve the spring hangers of the burden of supporting excessive loads.

Figure 2:
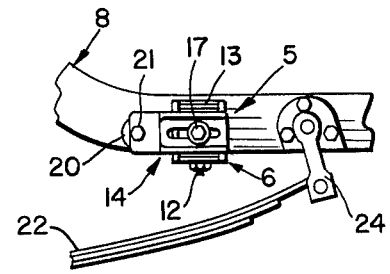
FIG. 2 is a fragmentary view of a portion of the structure shown in FIG. 1 and with one of the spring assisters in an inoperative position.
Figure 3:
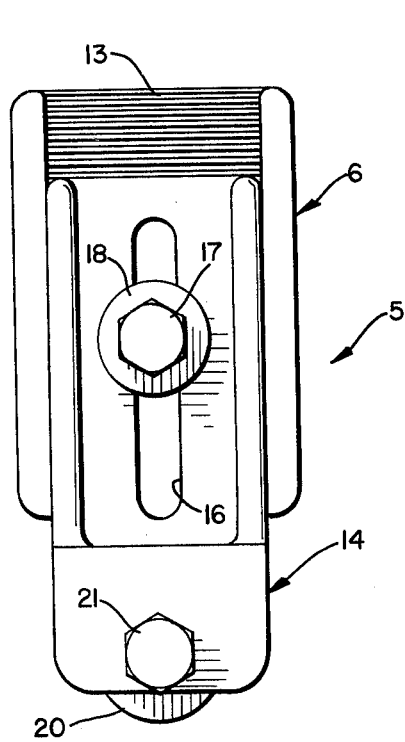
FIG. 3 is an enlarged view in side elevation showing one of the spring assisters detached from the vehicle frame.

When the vehicle is unloaded or carrying only a normal load so that the units 5 are not required, the bolts 17 are loosened and the support members 14 are swung upwardly and inwardly away from the spring shackles and clamped in their inoperative horizontal positions, as seen in FIG. 2, by tightening the bolt 17 of each unit.

A spacer 26 is provided between the bottom leg 9 and clamp bar 11, as seen in FIG. 4, to cause the clamp bar to more effectively assume clamping engagement with the bottom flange 10.

Various modifications and changes are contemplated and may obviously be resorted to, without departing from the function or scope of the invention.

I claim as my invention:

1. In combination with a rear leaf spring of a motor vehicle having an intermediate portion secured to a rear axle and end portions connected to parts of the vehicle frame by spring shackles; spring assisters connected to and depending from the vehicle frame and bearing on the leaf spring between and adjacent the shackles, each spring assister comprising a bracket secured to a part of the vehicle frame and having an upright leg disposed on the outer side of the frame, a support member, means securing said support member to an outer side of said upright bracket leg, said support member being disposed upright in an operative position thereof and having a bottom portion bearing on the leaf spring for assisting the spring in supporting the rear end of the vehicle and the load carried thereby, said bottom portion being recessed to define a downwardly opening fork, a roller carried by the fork, said roller constituting the part of the bottom portion bearing on the spring, and said means clamping the support member in different vertically adjusted positions on the bracket and functioning to secure the support member in an inoperative position crosswise of the upright leg of the bracket and out of engagement with the spring.

2. In a combination as defined by claim 1, said upright bracket leg and support member having inter-engaging serrated faces.

* * * * *